(12) United States Patent
Hesch et al.

(10) Patent No.: US 10,154,190 B2
(45) Date of Patent: *Dec. 11, 2018

(54) BALANCING EXPOSURE AND GAIN AT AN ELECTRONIC DEVICE BASED ON DEVICE MOTION AND SCENE DISTANCE

(71) Applicant: Google LLC, Mountain View, CA (US)

(72) Inventors: Joel Hesch, Mountain View, CA (US); James Fung, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/730,278

(22) Filed: Oct. 11, 2017

(65) Prior Publication Data

US 2018/0035043 A1 Feb. 1, 2018

Related U.S. Application Data

(63) Continuation of application No. 14/918,730, filed on Oct. 21, 2015, now Pat. No. 9,819,855.

(51) Int. Cl.
| | |
|---|---|
| *H04N 5/235* | (2006.01) |
| *H04N 5/232* | (2006.01) |
| *H04N 5/225* | (2006.01) |
| *H04N 5/14* | (2006.01) |
| *H04N 9/73* | (2006.01) |
| *G01B 11/25* | (2006.01) |
| *H04N 13/00* | (2018.01) |
| *H04N 13/15* | (2018.01) |
| *G01S 3/00* | (2006.01) |

(Continued)

(52) U.S. Cl.
CPC ........ *H04N 5/23216* (2013.01); *G01B 11/25* (2013.01); *G01B 11/2545* (2013.01); *G01S 3/00* (2013.01); *G01S 5/0263* (2013.01); *H04N 5/145* (2013.01); *H04N 5/2256* (2013.01); *H04N 5/2327* (2013.01); *H04N 5/2353* (2013.01); *H04N 5/23238* (2013.01); *H04N 5/23254* (2013.01); *H04N 5/23258* (2013.01); *H04N 5/243* (2013.01); *H04N 9/735* (2013.01); *H04N 13/0037* (2013.01); *H04N 13/15* (2018.05)

(58) Field of Classification Search
CPC .................................................. H04N 5/23216
See application file for complete search history.

(56) References Cited

U.S. PATENT DOCUMENTS

2005/0248660 A1* 11/2005 Stavely .................. G03B 39/00
348/208.16
2008/0291288 A1* 11/2008 Tzur .................. H04N 5/23248
348/222.1

(Continued)

OTHER PUBLICATIONS

International Preliminary Report on Patentability dated May 3, 2008 for PCT Application No. PCT/US2016/053087, 9 pages.

*Primary Examiner* — Gary C Vieaux

(57) ABSTRACT

An electronic device balances gain and exposure at an imaging sensor of the device based on detected image capture conditions, such as motion of the electronic device, distance of a scene from the electronic device, and predicted illumination conditions for the electronic device. By balancing the gain and exposure, the quality of images captured by the imaging sensor is enhanced, which in turn provides for improved support of location-based functionality.

20 Claims, 6 Drawing Sheets

(51) Int. Cl.
*G01S 5/02* (2010.01)
*H04N 5/243* (2006.01)

(56) References Cited

U.S. PATENT DOCUMENTS

| | | | | |
|---|---|---|---|---|
| 2010/0225780 | A1* | 9/2010 | Shimizu | H04N 5/23219 348/223.1 |
| 2010/0265342 | A1* | 10/2010 | Liang | H04N 5/145 348/208.4 |
| 2012/0130284 | A1* | 5/2012 | Ma | G01C 21/005 600/595 |
| 2012/0148224 | A1* | 6/2012 | Pozniansky | H04N 5/2354 396/153 |
| 2012/0242867 | A1* | 9/2012 | Shuster | G01L 311/22 348/240.2 |
| 2012/0262599 | A1* | 10/2012 | Brunner | H04N 5/23216 348/222.1 |
| 2012/0328157 | A1* | 12/2012 | Miyazaki | H04N 5/23219 382/103 |
| 2013/0293540 | A1* | 11/2013 | Laffargue | G06T 17/20 345/420 |
| 2014/0009639 | A1* | 1/2014 | Lee | H04N 5/232 348/229.1 |
| 2014/0235304 | A1* | 8/2014 | Suk | G01C 11/02 463/3 |
| 2015/0016692 | A1* | 1/2015 | Hanna | G06K 9/00604 382/117 |
| 2015/0022687 | A1* | 1/2015 | Galor | H04N 5/23229 348/229.1 |
| 2016/0330374 | A1* | 11/2016 | Ilic | H04N 5/23251 |

* cited by examiner

BALANCING EXPOSURE AND GAIN AT AN ELECTRONIC DEVICE BASED ON DEVICE MOTION AND SCENE DISTANCE

CROSS-SECTION TO RELATED APPLICATIONS

The present application is a continuation application of U.S. patent application Ser. No. 14/918,730, entitled "BALANCING EXPOSURE AND GAIN AT AN ELECTRONIC DEVICE BASED ON DEVICE MOTION AND SCENE DISTANCE" and filed on Oct. 21, 2015, the entirety of which is incorporated by reference herein.

FIELD OF THE DISCLOSURE

The present disclosure relates generally to imagery capture and processing and more particularly to configuring settings for capturing imagery.

BACKGROUND

Implementation of machine vision at an electronic device can support a variety of applications, such as simultaneous localization and mapping (SLAM), augmented reality (AR), and virtual reality (VR), by enabling identification of objects within the local environment of a device through the analysis of imagery of the local environment captured by the device. Object identification and other aspects of machine vision are enhanced when the captured imagery is of high-quality. The quality of the captured can be enhanced by employing capture settings at the image capturing device, such as gain and exposure, that are appropriate for the conditions under which the imagery is being captured. However, because the electronic device may be used in a wide variety of conditions, it can be difficult to identify and implement the correct capture settings for the image capturing device.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION OF EMBODIMENTS

Figure 1:
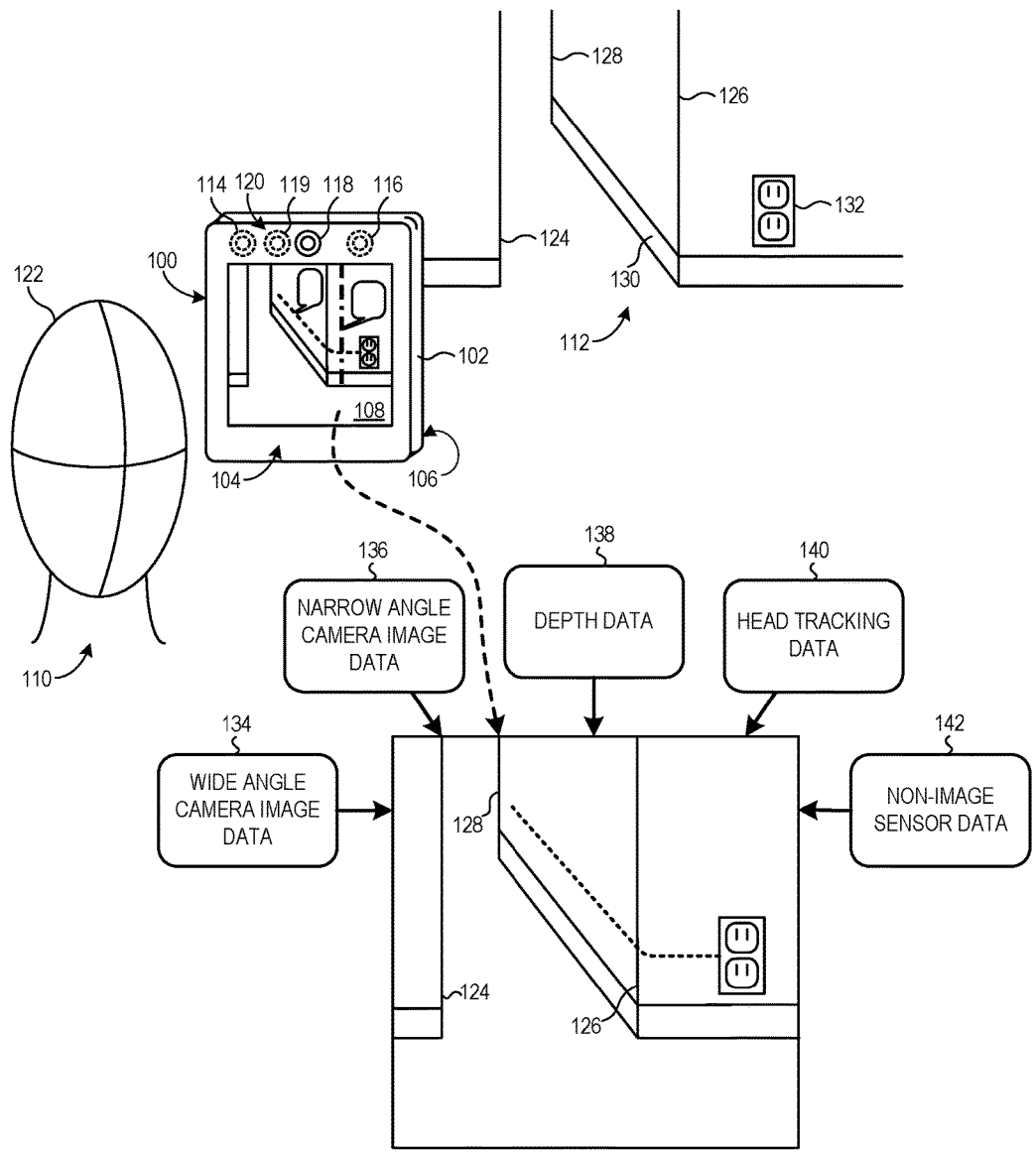
FIG. 1 is a diagram illustrating an electronic device configured to balance gain and exposure of at least one imaging sensor based on capture conditions such as device motion and scene distance in accordance with at least one embodiment of the present disclosure.

The following description is intended to convey a thorough understanding of the present disclosure by providing a number of specific embodiments and details involving the determination of a relative position or relative orientation of an electronic device based on image-based identification of objects in a local environment of the electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-7 illustrate various techniques for balancing gain and exposure at an imaging sensor of an electronic device based on image capture conditions detected by the electronic device, such as motion of the electronic device, distance of a scene from the electronic device, and predicted illumination conditions for the electronic device. By balancing the gain and exposure, the quality of images captured by the imaging sensor is enhanced, which in turn provides for improved support of location-based functionality, such as augmented reality (AR) functionality, virtual reality (VR) functionality, visual localization/odometry or other simultaneous localization and mapping (SLAM) functionality, and the like.

The term "capture conditions" as used herein refers to aspects of the environment of the mobile device and characteristics of the device itself that affect the quality of an image being captured by the mobile device. Examples of capture conditions include motion of the mobile device, illumination of the scene being captured, distance from features being captured in the image, and the like. The term "exposure" as used herein refers to the amount of time that a shutter of an imaging sensor or other image capture device is left open to allow application of light, as received through a lens of the imaging sensor, to a set of image sensors. The term "gain" as used herein refers to an amount of amplification of values or signals recorded by the set of image sensors in response to the application of light when the shutter is open. Conventionally, image capturing devices use gain and exposure relatively interchangeably, as under some capture conditions a change in one of these aspects is not distinguishable from a change in the other. However, under other capture conditions, including conditions frequently encountered by a mobile device, changing one of gain or exposure rather than the other can result in capturing a higher-quality image. For example, under capture conditions wherein a rotational velocity of the electronic device is relatively high, a high exposure can result in capture of a blurred image.

Accordingly, under such capture conditions the quality of the captured image can be improved by using a relatively higher gain and relatively lower exposure. In contrast, when the rotational velocity of the electronic device is relatively low, a high gain can result in a noisy image. Accordingly, under such capture conditions the quality of the captured image can be improved by using a relatively lower gain and relatively higher exposure. Using the techniques described herein, the electronic device can identify capture conditions, using a combination of non-visual sensors, such as a gyroscope to indicate rotational velocity, and analysis of previously-captured imagery, such as feature tracks for features identified from the imagery. Based on the identified capture conditions, the electronic device can balance the gain and exposure of the imaging sensor to enhance the quality of images captured by the imaging sensor. The enhanced quality of the captured images in turn provides for improved identification of features in the local environment of the electronic device and therefore improves support of location-based functionality.

FIG. 1 illustrates an electronic device 100 configured to support location-based functionality, such as SLAM, VR, or AR, using image and non-visual sensor data in accordance with at least one embodiment of the present disclosure. The electronic device 100 can include a user-portable mobile device, such as a tablet computer, computing-enabled cellular phone (e.g., a "smartphone"), a notebook computer, a personal digital assistant (PDA), a gaming system remote, a television remote, and the like. In other embodiments, the electronic device 100 can include another type of mobile device, such as an automobile, remote-controlled drone or other airborne device, and the like. For ease of illustration, the electronic device 100 is generally described herein in the example context of a mobile device, such as a tablet computer or a smartphone. However, the electronic device 100 is not limited to these example implementations.

In the depicted example, the electronic device 100 includes a housing 102 having a surface 104 opposite another surface 106. In the example thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 106 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging sensors 114 and 116 and a depth sensor 120 disposed at the forward-facing surface 106 and an imaging sensor 118 disposed at the user-facing surface 104. In one embodiment, the imaging sensor 114 is implemented as a wide-angle imaging sensor having a fish-eye lens or other wide-angle lens to provide a wider angle view of the local environment 112 facing the surface 106. The imaging sensor 116 is implemented as a narrow-angle imaging sensor having a typical angle of view lens to provide a narrower angle view of the local environment 112 facing the surface 106. Accordingly, the imaging sensor 114 and the imaging sensor 116 are also referred to herein as the "wide-angle imaging sensor 114" and the "narrow-angle imaging sensor 116," respectively. As described in greater detail below, the wide-angle imaging sensor 114 and the narrow-angle imaging sensor 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via image analysis. The imaging sensor 118 can be used to capture image data for the local environment 112 facing the surface 104. Further, in some embodiments, the imaging sensor 118 is configured for tracking the movements of the head 122 or for facial recognition, and thus providing head tracking information that may be used to adjust a view perspective of imagery presented via the display 108.

The depth sensor 120, in one embodiment, uses a modulated light projector 119 to project modulated light patterns from the forward-facing surface 106 into the local environment, and uses one or both of imaging sensors 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from image analysis (e.g., stereoscopic analysis) of the image data captured by the imaging sensors 114 and 116. Alternatively, the depth data from the depth sensor 120 may be used in place of depth information obtained from image analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 120.

The electronic device 100 also may rely on non-visual pose information for pose detection. This non-visual pose information can be obtained by the electronic device 100 via one or more non-visual sensors (not shown in FIG. 1), such as an IMU including one or more gyroscopes, magnetometers, and accelerometers. In at least one embodiment, the IMU can be employed to generate pose information along multiple axes of motion, including translational axes, expressed as X, Y, and Z axes of a frame of reference for the electronic device 100, and rotational axes, expressed as roll, pitch, and yaw axes of the frame of reference for the electronic device 100. The non-visual sensors can also include ambient light sensors and location sensors, such as GPS sensors, or other sensors that can be used to identify a pose of the electronic device 100, such as one or more wireless radios, cellular radios, and the like.

In operation, the electronic device 100 uses the image sensor data and the non-visual sensor data to estimate a pose of the electronic device 100. In at least one embodiment, after a reset the electronic device 100 determines an initial pose based on geolocation data, other non-visual sensor data, visual sensor data as described further below, or a combination thereof. As the pose of the electronic device 100 changes, the non-visual sensors generate, at a relatively high rate, non-visual pose information reflecting the changes in the device pose. Concurrently, the visual sensors capture images that also reflect device pose changes. Based on this non-visual and visual pose information, the electronic device 100 updates the initial pose to reflect a current pose of the device.

The electronic device 100 generates visual pose information based on the detection of spatial features in image data captured by one or more of the imaging sensors 114, 116, and 118. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging sensors 114 and 116 capture wide angle imaging sensor image data 134 and narrow angle imaging sensor image data 136, respectively, that includes these spatial features of the hallway. In this example, the depth sensor 120 also captures depth data 138 that reflects the relative distances of these spatial features relative to the current pose of the electronic device 100. Further, the user-facing imaging sensor 118 captures image data representing head tracking data 140 for the current pose of the head 122 of the user 110. Non-visual sensor data 142, such as readings from the IMU, also is collected by the electronic device 100 in its current pose.

From this input data, the electronic device 100 can determine an estimate of its relative pose without explicit absolute localization information from an external source. To illustrate, the electronic device 100 can perform analysis of the wide angle imaging sensor image data 134 and the narrow angle imaging sensor image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured images of the image data 134 and 136, determine the initial distances to these spatial features, and then track the changes in position and distances of these spatial features in subsequent captured imagery to determine the change in pose of the electronic device 100 in a free frame of reference. In this approach, certain non-visual sensor data, such as gyroscopic data or accelerometer data, can be used to correlate spatial features observed in one image with spatial features observed in a subsequent image.

The electronic device 100 generates feature descriptors for the spatial features identified in the captured imagery. Each of the generated feature descriptors describes the orientation, gravity direction, scale, and other aspects of one or more of the identified spatial features. The generated feature descriptors are compared to a set of stored descriptors (referred to for purposes of description as "known feature descriptors") that each identifies previously identified spatial features and their corresponding poses. In at least one embodiment, each of the known feature descriptors is a descriptor that has previously been generated, and its pose definitively established, by either the electronic device 100 or another electronic device. The known feature descriptors can be stored at the electronic device 100, at a remote server or other storage device, or a combination thereof. Accordingly, the comparison of the generated feature descriptors can be performed at the electronic device 100, at the remote server or other device, or a combination thereof.

In at least one embodiment a generated feature descriptor is compared to a known feature descriptor by comparing each aspect of the generated feature descriptor (e.g. the orientation of the corresponding feature, the scale of the corresponding feature, and the like) to the corresponding aspect of the known feature descriptor and determining an error value indicating the variance between the compared features. Thus, for example, if the orientation of feature in the generated feature descriptor is identified by a vector A, and the orientation of the feature in the known feature descriptor is identified by a vector B, the electronic device 100 can identify an error value for the orientation aspect of the feature descriptors by calculating the difference between the vectors A and B. The error values can be combined according to a specified statistical technique, such as a least squares technique, to identify a combined error value for each known feature descriptor being compared, and the matching known feature descriptor identifies as the known feature descriptor having the smallest combined error value.

Each of the known feature descriptors includes one or more fields identifying the pose (e.g., the orientation or point of view) of the corresponding spatial feature. Thus, a known feature descriptor can include pose information indicating the location of the spatial feature within a specified coordinate system (e.g. a geographic coordinate system representing Earth) within a specified resolution (e.g. 1 cm), the orientation of the point of view of the spatial feature, the distance of the point of view from the feature and the like. The generated feature descriptors are compared to the known feature descriptors to identify one or more matched known feature descriptors. The matched known feature descriptors are then used to identify a pose of the electronic device 100.

In some scenarios, the matching process will identify multiple known feature descriptors that match corresponding generated feature descriptors, thus indicating that there are multiple features in the local environment of the electronic device 100 that have previously been identified. The corresponding poses of the matching known feature descriptors may vary, indicating that the electronic device 100 is not in a particular one of the poses indicated by the matching known feature descriptors. Accordingly, the electronic device 100 may refine its estimated pose by interpolating its pose between the poses indicated by the matching known feature descriptors using conventional interpolation techniques.

In at least one embodiment, the electronic device 100 can use the generated feature descriptors and the information from the non-visual sensors to identify capture conditions for the imaging sensors 114, 116, 118. Examples of such capture conditions include motion of the electronic device 100, distance of objects of interest (scene distance) from the imaging sensors 114, 116, 118, illumination in the environment of the electronic device 100, and the like. Based on the capture conditions, the electronic device 100 can balance gain and exposure settings for one or more of the imaging sensors 114, 116, and 118. For purposes of description, the electronic device 100 is described as balancing the gain and exposure settings for the imaging sensor 114. However, it will be appreciated that in other embodiments the electronic device 100 can individually balance the gain and exposure settings for any or all of the imaging sensors 114, 116, and 118.

As indicated above, one example of the capture conditions that can be identified at the electronic device 100 is device motion. In particular, the electronic device 100 can identify its motion based on non-visual sensor data, based on features identified in captured imagery, or a combination thereof. To illustrate via an example, in at least one embodiment the electronic device 100 can identify its rotational velocity based on information provided by one or more gyroscopes of the electronic device 100. In another embodiment, the electronic device 100 can identify its motion by tracking differences in the locations of one or more features across different images captured by the imaging sensors 114, 116, and 118. The differences over time in the location of a given feature is referred to as the "feature track" for that feature. The feature tracks identified by the electronic device 100 indicate the motion of the electronic device 100 relative to the tracked features. For example, the electronic device 100 can identify the feature tracks of the corners 124, 126, 128 by identifying differences in the relative position of the corners 124, 126, and 128 across different captured images. The electronic device 100 uses the feature tracks to identify changes in its pose, and based on these changes in pose derives information, such as distance, rotational and linear velocity, and the like, indicative of its motion. In at least one embodiment, the electronic device 100 does not use all available feature tracks to identify changes in its pose, but selects a subset of identified features. For example, in some scenarios the electronic device 100 may employ feature tracks for features identified as being a threshold distance from the electronic device 100, as those feature tracks may provide a more stable or reliable indication of changes in the pose of the electronic device 100, and therefore a better indication of the device motion.

Based on the motion indicated by the one or more gyroscopes, the feature tracks, or a combination thereof, the electronic device 100 balances gain and exposure settings for the imaging sensor 114. For example, in at least one embodiment the imaging sensor 114 includes an image sensor array to record light that passes through a lens of the camera when a shutter of the camera is open. The sensor array has an exposure range indicating the maximum difference in light intensities that can be recorded by different sensors of the array. The electronic device 100 can include one or more light sensors (not shown) to detect ambient light in the environment of the electronic device 100 and based on the ambient light, manual settings indicated by a user, or a combination thereof, identify a range of luminance values for the image being captured. Based on this range of luminance values, the electronic device 100 identifies a mid-tone value for the scene being captured, and identifies an intensity value that will result in the mid-tone of the captured image to match the mid-tone of the scene. The electronic device 100 then sets the exposure and the gain for the imaging sensor 114 to achieve this intensity. For purposes of description, the combination of exposure and gain is referred to as the intensity setting for the imaging sensor 114. Each intensity setting for the imaging sensor is associated with a different desired mid-tone output for the sensor array.

For a particular intensity setting, different combinations of exposure and gain for the imaging sensor 114 can be used to achieve the intensity setting, with different combinations resulting in different qualities of the resulting image, depending on the capture conditions of the electronic device 100. For example, with respect to rapid motion of the electronic device 100, relatively lower exposure and relatively higher gain will typically result in the imaging sensor 114 capturing a higher quality image. Accordingly, in response to identifying an increase in its rotational velocity or other aspect of motion, the electronic device 100 can increase the gain and commensurately reducing the exposure of the imaging sensor 114 to achieve the intensity setting, thereby improving the quality of captured images. In cases where the electronic device 100 is experiencing relatively little motion, a high gain of the imaging sensor 114 can result in capture of a noisy image. Therefore, in response to identifying a decrease in its rotational velocity the electronic device 100 can decrease the gain and commensurately increase the exposure of the imaging sensor to achieve the intensity setting, thereby reducing noise in the captured images.

In at least one embodiment, instead of or in addition to identifying its motion, the electronic device 100 can identify its distance from one or more features of interest. This distance is referred to herein as the "scene distance" for the electronic device 100. The features of interest on which the scene distance is based can be identified in any of a variety of ways. For example, the features of interest can be identified based on their consistency of position, quality, or other aspects across a sequence of images captured by the imaging sensors 114, 116, 118. As another example, the electronic device 100 can identify the features of interest as those features identified with a distance range where a majority of features have been identified in one or more images captured by the imaging sensors 114, 116, and 118. In many cases, images associated with a high scene distance benefit from a higher exposure. Accordingly, in response to identifying a high scene distance, the electronic device the electronic device 100 can decrease the gain and commensurately increase the exposure of the imaging sensor to achieve the intensity setting, thereby reducing noise in the captured images.

The electronic device 100 can also set the intensity setting, or balance the gain and exposure associated with the intensity setting, based on predicted illumination conditions for the electronic device 100. For example, in at least one embodiment the electronic device 100 can predict its future pose (location and orientation) based on a combination of its current pose and its current motion or recent motion history. Further, the electronic device 100 can access one or more stored feature descriptors associated with the future pose to identify illumination features for the future pose, thereby predicting future illumination conditions for the electronic device 100. Based on these predicted conditions, the electronic device 100 can adjust the intensity setting or the balance between gain and exposure to ensure that images captured by the electronic device 100 are of higher quality. These higher-quality images can be used by the electronic device 100 for improved feature detection and other image analysis, improving the quality of the location-based services supported by the image analysis.

Figure 2:
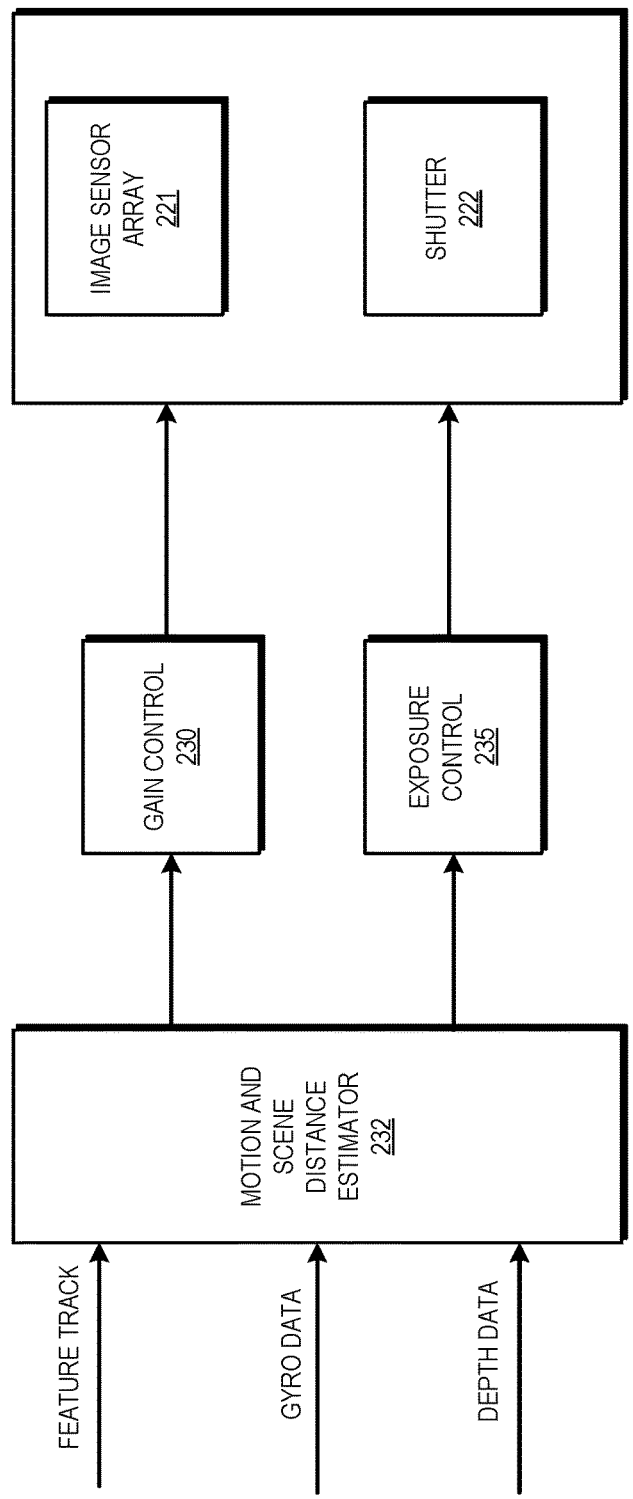
FIG. 2 is a diagram illustrating a portion of the electronic device of FIG. 1 that balances gain and exposure for the at least one imaging sensor based on a combination of non-visual sensor data and feature tracks identified from imagery captured at the electronic device in accordance with at least one embodiment of the present disclosure.

FIG. 2 is a block diagram of a portion of the electronic device 100 that balances gain and exposure for the imaging sensor 114 based on a combination of non-visual sensor data and feature tracks identified from imagery captured at the electronic device 100 in accordance with at least one embodiment of the present disclosure. In the illustrated example, the imaging sensor 114 includes a sensor array 221 and a shutter 222. The sensor array 221 is an array of image sensors, such as active-pixel sensors, charge-coupled device (CCD) sensors, and the like, wherein each sensor in the array is generally configured to convert light applied to the sensor to one or more electrical signals indicative of the intensity of the light applied to the sensor. The sensor array 221 includes one or more amplifiers and other circuitry to control the ratio of the amplitude of the electrical signals to the intensity of the applied light. This ratio is referred to as the gain of the imaging sensor 114, and is an adjustable quantity as described further herein. The shutter 222 is a device that can be controlled, via electrical signaling, to open or close. When the shutter 222 is opened, light passing through an aperture (not shown) of the imaging sensor 114 is applied to the sensor array 221. Conversely, when the shutter 222 is closed, light passing through the aperture is not applied to the sensor array 221. The amount of time that the shutter 222 is opened to capture and image is referred to as the exposure for that image.

To control the gain and exposure for the imaging sensor 114, the electronic device includes a gain control module 230, an exposure control module 235, and a motion and scene distance estimator 232. The gain control module 230 is configured to set the gain for the imaging sensor 114 based on control signaling received from the estimator 232. Similarly, the exposure control module 235 is configured to set the exposure for the imaging sensor 114 based on other control signaling received from the estimator 232. The estimator 232 is configured to receive information indicating motion and scene distance of the electronic device 100, including gyroscope data, feature track information, and depth camera information. In addition, the estimator 232 can receive information indicating, based on detected ambient light, user settings, and other factors, the desired intensity setting for the imaging sensor 114. Based on this information, the estimator 232 estimates the motion and scene distance for the electronic device 100. Further, based on the estimated motion and scene distance, the estimator 232 balances the gain and exposure for the imaging sensor 114 to achieve the indicated intensity setting.

Figure 3:
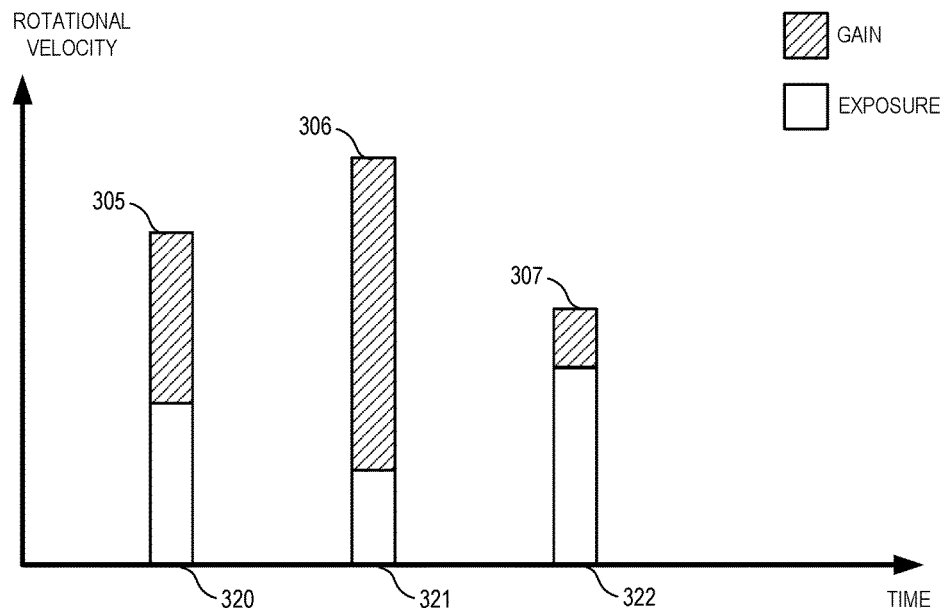
FIG. 3 is a diagram illustrating balancing of gain and exposure of the at least one imaging sensor based on rotational velocity of the electronic device of FIG. 1 in accordance with at least one embodiment of the present disclosure.

An example operation of the estimator 232 is illustrated by FIG. 3, which depicts a diagram including an x-axis representing time, a y-axis representing rotational velocity of the electronic device 100, and bars 305, 306, and 307. Each of the bars 305, 306, and 307 includes a crosshatched portion, indicating the gain of the imaging sensor 114 and an unfilled portion indicating the corresponding exposure of the imaging sensor 114. Each of the bars 305-307 is associated with the same intensity setting for the imaging sensor 114, and thus each represents different relative levels of gain and exposure to achieve the same intensity setting. In the illustrated example, at time 320 the estimator 232 determines, based on the received gyroscope information and feature tracks, that the rotational velocity of the electronic device 100 is at a level 310. In response, the estimator 232 sets the gain and exposure for the imaging sensor 114 as illustrated by bar 305. At time 321, the estimator 232 identifies that the rotational velocity of the electronic device 100 has increased above the level 310. In response, as illustrated by bar 306, the estimator 232 increases the gain and reduces the exposure of the imaging sensor 114. At time 322, the estimator 232 identifies that the rotational velocity of the electronic device 100 has decreased to a level below the level 310. In response, as illustrated by bar 307, the estimator 232 decreases the gain and increases the exposure level of the imaging sensor 114. Thus, the estimator 232 adjusts the balance between the gain and the exposure of the imaging sensor 114 to account for changes in the rotational velocity of the electronic device 100.

Figure 4:
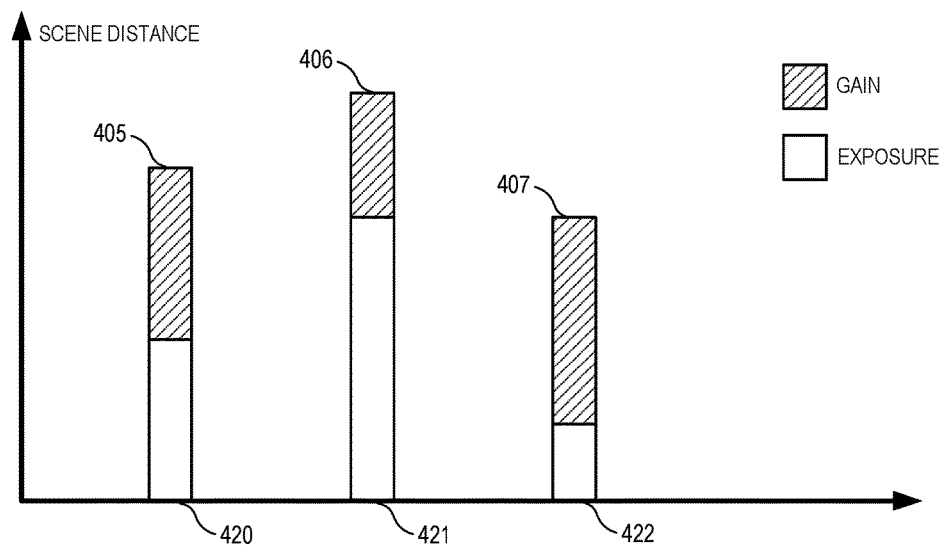
FIG. 4 is a diagram illustrating balancing of gain and exposure of the at least one imaging sensor based on the distance of a scene from the electronic device of FIG. 1 in accordance with at least one embodiment of the present disclosure.

Another example operation of the estimator 232 is illustrated by FIG. 4, which depicts a diagram including an x-axis representing time, a y-axis representing a scene depth of the electronic device 100, and bars 405, 406, and 407. Similar to the bars of FIG. 3, each of the bars 405-407 includes a crosshatched portion, indicating the gain of the imaging sensor 114 and an unfilled portion indicating the corresponding exposure of the imaging sensor 114. Each of the bars 405-407 is associated with the same intensity setting for the imaging sensor 114. In the illustrated example, at time 420 the estimator 232 determines, based on the received feature tracks and information from the depth camera, that the scene distance of the electronic device 100 is at a distance 410. In response, the estimator 232 sets the gain and exposure for the imaging sensor 114 as illustrated by bar 405. At time 421, the estimator 232 identifies that the scene distance for the electronic device 100 has increased and is thus greater than the distance 410. In response, as illustrated by bar 406, the estimator 232 increases the exposure and reduces the gain of the imaging sensor 114. At time 422, the estimator 232 identifies that the scene distance for the electronic device 100 has decreased to a distance below the distance 410. In response, as illustrated by bar 307, the estimator 232 increases the gain and decreases the exposure level of the imaging sensor 114. Thus, the estimator 232 adjusts the balance between the gain and the exposure of the imaging sensor 114 in response to changes in the scene distance for the electronic device 100. It will be appreciated that although the examples of FIGS. 3 and 4 depict balancing the gain and exposure of the imaging sensor 114 based on a single capture condition (rotational velocity and scene distance, respectively), in at least one embodiment the estimator 232 adjusts the balance between the gain and the exposure based on a combination of different capture conditions. For example, the estimator 232 can adjust the balance between the gain and the exposure of the imaging sensor 114 based on both rotation velocity and scene distance.

Figure 5:
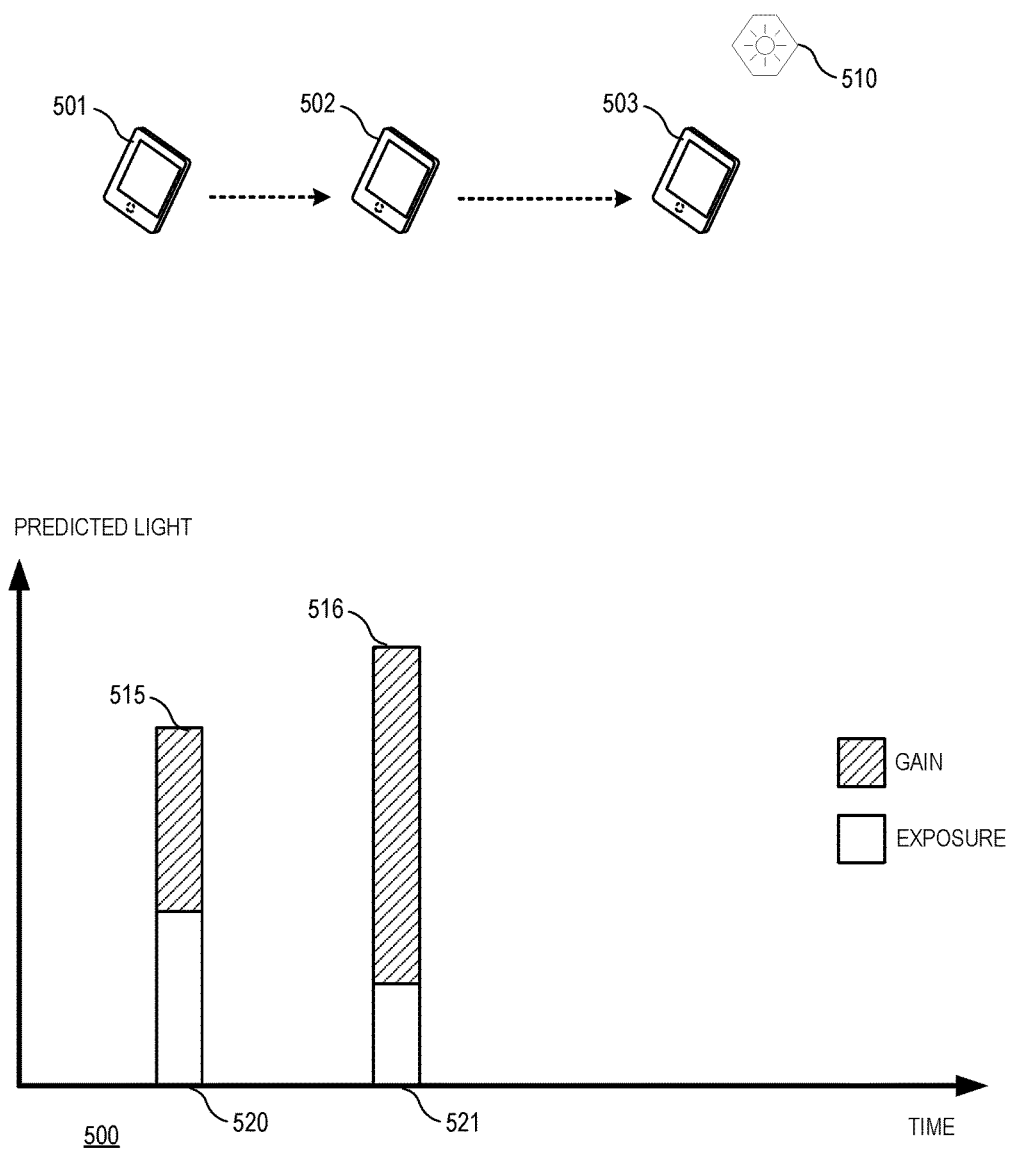
FIG. 5 is a diagram illustrating balancing of gain and exposure of the at least one imaging sensor based on predicting illumination conditions for the electronic device of FIG. 1 in accordance with at least one embodiment of the present disclosure.

FIG. 5 illustrates an example of the estimator 232 balancing gain and exposure based on predicted illumination conditions for the electronic device 100 in accordance with at least one embodiment of the present disclosure. In the depicted example, the electronic device 100 is initially in a pose 501 that is relatively distant from a light source 510, then moves to a pose 502 closer to the light source 510, and subsequently moves to a pose 503 that is still closer to the light source 510. FIG. 5 also illustrates depicts a diagram 500 including an x-axis representing time, a y-axis representing predicted illumination conditions for the electronic device 100, and bars 515 and 516 each having a crosshatched portion, indicating the gain of the imaging sensor 114 and an unfilled portion indicating the corresponding exposure of the imaging sensor 114. In the illustrated example, at time 520, corresponding to pose 501 the estimator 232 determines, based on the rotational velocity of the electronic device 100, the scene distance for the electronic device 100, or a combination thereof, to set the gain and exposure for the imaging sensor 114 as illustrated by bar 515. At time 521, corresponding to pose 502, the estimator 232 identifies that the pose of the electronic device 100 has changed. Based on this change in position, the estimator 232 identifies a predicted path of motion for the electronic device 100 and a predicted future position of the electronic device 100 indicated by the predicted path of motion. The estimator 232 therefore predicts that the electronic device 100 will be at or near pose 503 in the near future. Based on this prediction, the electronic device 100 accesses one or more stored feature descriptors for pose 503 which indicate an amount of illumination associated with pose 503. Thus, for example, the feature descriptors may indicate that pose 503 is relatively closer to the light source 510 and therefore typically corresponds to a higher amount of illumination than pose 502. In response to this predicted increase in illumination for the electronic device 100, the estimator 232 increases the gain and reduces the exposure for the imaging sensor 114. In at least one embodiment, instead of or in addition to changing the balance of the gain and the exposure, the electronic device 100 can change the intensity setting for the imaging sensor 114 in response to the change in predicted illumination. Thus, the electronic device 100 can change the gain, exposure, or intensity setting for the imaging sensor 114 based on predicted changes in illumination. This ensures that when the electronic device reaches the predicted position (pose 503), the settings for the imaging sensor 114 are already set to a level appropriate for the illumination associated with the pose. In turn, this increases the likelihood that the imaging sensor 114 will capture images of relatively high quality at pose 503.

Figure 6:
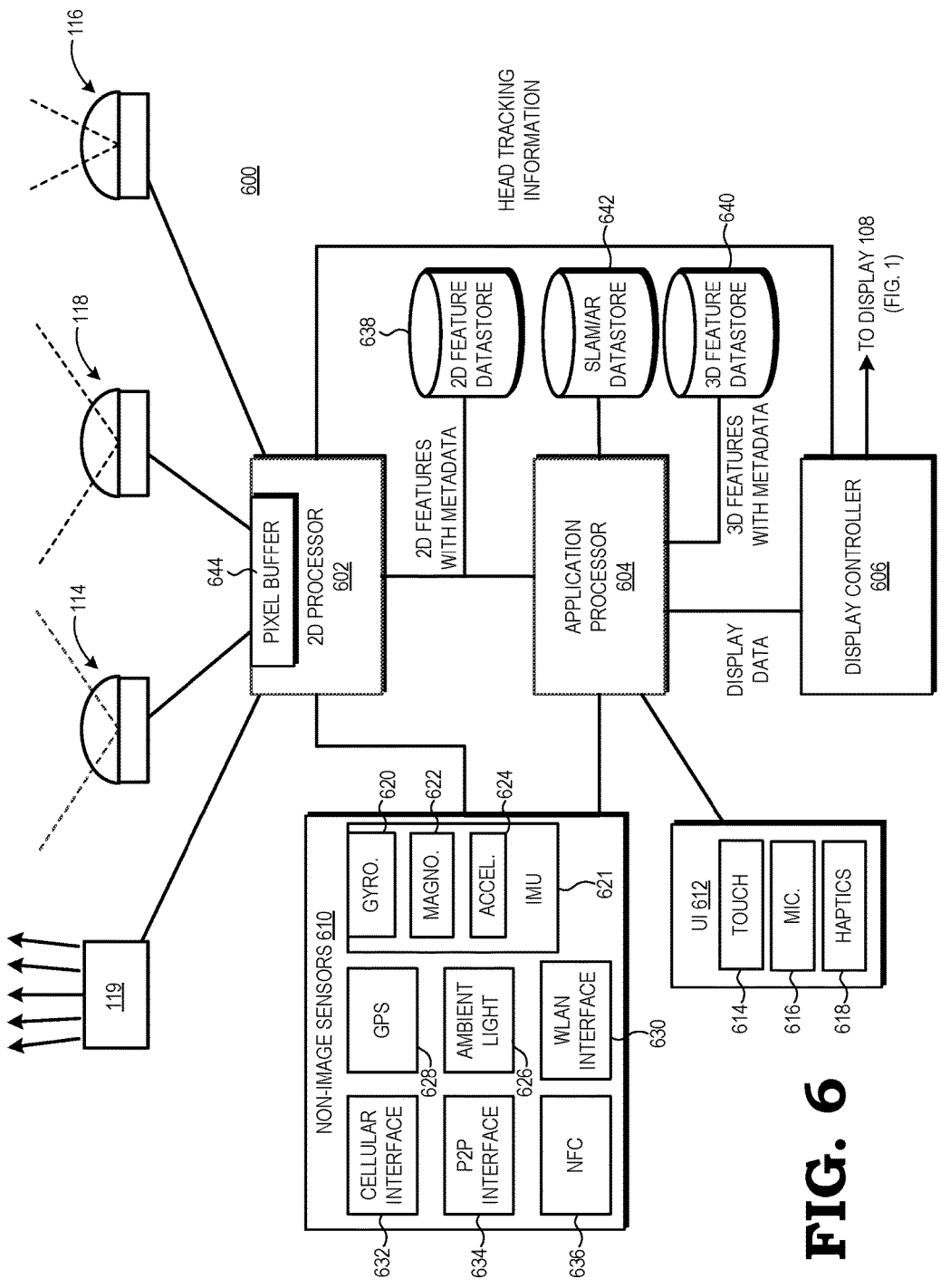
FIG. 6 is a block diagram illustrating a processing system of an electronic device for balancing gain and exposure of the at least one imaging sensor of the electronic device in accordance with at least one embodiment of the present disclosure.

FIG. 6 illustrates an example processing system 600 implemented by the electronic device 100 in accordance with at least one embodiment of the present disclosure. The processing system 600 includes the wide-angle imaging sensor 114, the narrow-angle imaging sensor 116, the user-facing imaging sensor 118, and the depth sensor 120. The processing system 600 further includes a 2D processor 602, an application processor 604, a display controller 606, a set 610 of non-visual sensors, and a user interface 612.

The user interface 612 includes one or more components manipulated by the user to provide user input to the electronic device 100, such as a touchscreen 614, a mouse, a keyboard, a microphone 616, various buttons or switches, and various haptic actuators 618. The set 610 of non-visual sensors can include any of a variety of sensors used to provide non-visual context or state of the electronic device 100. Examples of such sensors include an IMU 621 including a gyroscope 620, a magnetometer 622, and an accelerometer 624, and an ambient light sensor 626. The non-visual sensors further can include various wireless reception or transmission based sensors, such as a GPS receiver 628, a wireless local area network (WLAN) interface 630, a cellular interface 632, a peer-to-peer (P2P) wireless interface 634, and a near field communications (NFC) interface 636. The non-visual sensors also can include user input components of the user interface 612, such as the touchscreen 614 or the microphone 616.

The electronic device 100 further has access to various datastores storing information or metadata used in conjunction with its image processing, location mapping, and location-utilization processes. These datastores can include a 2D feature datastore 638 to store metadata for 2D spatial features identified from imagery captured by the imaging sensors of the electronic device 100 and a 3D spatial feature datastore 640 to store metadata for 3D spatial features identified from depth sensing for the 2D spatial features using analysis or modulated light-based depth sensing. The metadata stored for the 2D and 3D features can include, for example, timestamps for synchronization purposes, image identifiers of the images in which the spatial features were identified, identifiers of the capture device used, calibration information, and the like. This metadata further can include non-visual sensor data that was contemporaneously with the image containing the identified spatial feature, such as GPS, Wi-Fi, or other radio information, time-of-day information, weather condition information (which affects the lighting), and the like. The datastores further can include a SLAM/AR datastore 642 that stores SLAM-based information, such as mapping information for areas of the local environment 112 (FIG. 1) already explored by the electronic device 100, or AR information, such as CAD-based representations of the relative locations of objects of interest in the local environment 112. The datastores 638 and 640 can also store known feature descriptors and feature descriptors generated based on imagery captured at the electronic device 100. The datastores may be local to the electronic device 100, such as on a hard drive, solid state memory, or removable storage medium (not shown), the datastores may be remotely located and accessible via, for example, one or more of the wireless interfaces of the electronic device 100, or the datastores may be implemented as a combination of local and remote data storage.

In the depicted implementation, the processing system 600 employs two processors: the 2D processor 602 configured to efficiently identify 2D spatial features from visible-light imagery and depth sensor imagery captured by the imaging sensors of the electronic device 100; and the application processor 604 configured to efficiently identify 3D spatial features from the 2D spatial features and to efficiently provide location-based functionality, such as visual odometry or other SLAM functionality, AR functionality, and the like. However, in other embodiments, the described functionality of the 2D processor 602 and the application processor 604 may be implemented in a single processor, or more than two processors together may implement the described functionality. The 2D processor 602 can be implemented as, for example, a single-core or multiple-core graphics processing unit (GPU) and the application processor 604 can be implemented as, for example, a GPU or a single-core or multiple-core central processing unit (CPU).

The 2D processor 602 is coupled to the wide-angle imaging sensor 114, the narrow-angle imaging sensor 116, and the user-facing imaging sensor 118 so as to receive image data captured by the imaging sensors in one or more pixel row buffers 644. In one embodiment, the 2D processor 602 includes an interface and a pixel row buffer 644 for each imaging sensor so as to be able to receive image data from each imaging sensor in parallel. In another embodiment, the 2D processor 602 includes a single interface and a pixel row buffer 644 and thus the 2D processor 602 multiplexes between the imaging sensors.

The 2D processor 602 is configured to process the captured image data from the imaging sensors to identify 2D spatial features present in the image data. In some embodiments, the 2D processor 602 implements a hardware configuration specifically designed for this task. In other embodiments, the 2D processor 602 includes a more general processor architecture that provides the 2D spatial feature detection through execution of a software program configured to implement the 2D spatial feature detection process. The 2D processor 602 also may implement a combination of specialized hardware and specialized software for this purpose. As described above, any of a variety of well-known 2D spatial feature detection or extraction algorithms may be implemented by the 2D processor 602. The 2D processor 602 stores metadata and other information pertaining to the identified 2D spatial features to the 2D feature datastore 638.

The 2D processor 602, in one embodiment, is configured to implement the image-based pose estimator 232 to analyze imagery captured by the user-facing imaging sensor 118 to track the current pose (e.g., the current location) of the user's head using any of a variety of well-known head tracking algorithms. In the depicted example, the 2D processor 602 provides the head tracking information to the display controller 606, which in turn is configured to adjust the displayed imagery to react to changes in the user's view perspective as reflected in changes in pose of the user's head. In another embodiment, the 2D processor 602 provides the head tracking information to the application processor 604, which in turn modifies the display data to reflect updated view perspectives before the display data is provided to the display controller 606.

The 2D processor 602 also acts as a controller that operates the modulated light projector 119 in its use in determining depth data for spatial features identified in the captured imagery of the local environment 112. In certain conditions, such as relatively bright settings (as sensed using the ambient light sensor 626), the 2D processor 602 may use image analysis of imagery concurrently captured by the wide-angle imaging sensor 114 and the narrow-angle imaging sensor 116 to determine depth data for spatial features present in the captured imagery. In other conditions, such as relatively low lighting conditions, the 2D processor 602 may switch to the use of the depth sensor 120 (FIG. 1) to determine this depth data. In other embodiments, the processing system 600 implements a controller (not shown) separate from the 2D processor 602 to control the operation of the modulated light projector 119.

As described above, the depth sensor 120 relies on the projection of a modulated light pattern by the modulated light projector 119 into the local environment and on the capture of the reflection of the modulated light pattern therefrom by one or more of the imaging sensors. Thus, the 2D processor 602 may use one or both of the forward-facing imaging sensors 114 and 116 to capture the reflection of a projection of the modulated light pattern and process the resulting imagery of the reflected modulated light pattern to determine the depths of corresponding spatial features represented in the reflected modulated light pattern. To match a depth reading with a corresponding 2D spatial feature, the 2D processor 602 can perform a 2D spatial feature analysis on the depth imagery to determine a 2D spatial feature and its relative depth, and then attempt to match the 2D spatial feature to a corresponding spatial feature identified in the visual-light imagery captured at or near the same time as the reflected modulated light imagery was captured. In another embodiment, the 2D processor 602 can capture a visible-light image, and quickly thereafter control the modulated light projector 119 to project a modulated light pattern and capture a reflected modulated light image. The 2D processor 602 then can develop a depth map for the visible-light image from the reflected modulated light image as they effectively represent the same scene with the same spatial features at the same coordinates due to the contemporaneous capture of the visible-light image and the reflected modulated light image.

The application processor 604 is configured to identify spatial features represented in the captured imagery using the 2D spatial features represented in the 2D feature datastore 638 and using non-visual sensor information from the set 610 of non-visual sensors. As with the 2D processor 602, the application processor 604 may be configured to perform this process through a specialized hardware configuration, through execution of software configured for this process, or a combination of specialized hardware and software. Metadata and other information for the identified 3D spatial features are stored in the 3D feature datastore 640. In at least one embodiment, the application processor 604 implements (e.g., executes instructions that, when executed, manipulate the application processor 604 to perform the operations of the motion and scene distance estimator 232 (FIG. 2). Thus, the application processor 604 can identify aspects of the motion of the electronic device 100, such as the rotational velocity, can identify the scene distance for the electronic device 100, can identify the predicted illumination for the electronic device 100, and other capture conditions. Based on these conditions, the application processor 604 can set the intensity setting for the imaging sensor 114, and balance the gain and the exposure for that intensity setting as described above.

The application processor 604 further is configured to provide SLAM, AR, VR, and other location-based functionality using 3D spatial features represented in the 3D feature datastore 640 and using the current context of the electronic device 100 as represented by non-visual sensor data. The current context can include explicit or implicit user input obtained from, for example, the user interface 612 or via an analysis of user interactions. This functionality can include determining the current relative pose of the electronic device 100. Similarly, the application processor 604 can use a history of positions/orientations of the electronic device 100 and a history of spatial features observed in those positions/orientations to create a map of the local environment 112.

The location-based functionality provided by the application processor 604 further can include AR-related or VR-related functionality that includes identifying and accessing from the SLAM/AR datastore 642 graphical information to be provided as a graphical overlay on the display 108 based on the current pose determined by the application processor 604. This graphical overlay can be provided in association with imagery captured by the imaging sensors in the current pose for display at the display 108 via the display controller 606. The display controller 606 operates to control the display 108 (FIG. 1) to display imagery represented by display data received from the application processor 604. Further, in some embodiments, the display controller 606 can receive head tracking information from the 2D processor 602 and adjust the view perspective of the imagery being displayed based on the user head position or eye position represented in the received head tracking information.

Figure 7:
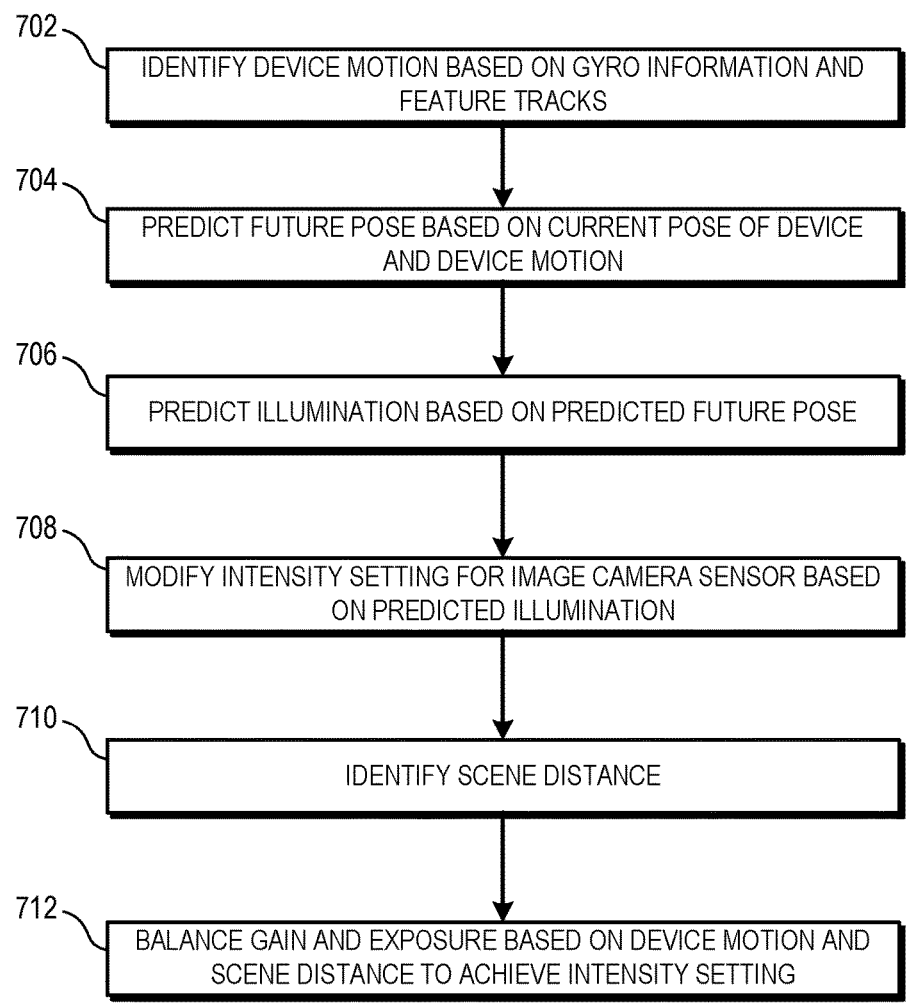
FIG. 7 is a flow diagram illustrating an operation of an electronic device to balance gain and exposure of at least one imaging sensor based on capture conditions such as device motion and scene distance in accordance with at least one embodiment of the present disclosure.

FIG. 7 illustrates a flow diagram of a method 700 of balancing gain and exposure for an imaging sensor at the electronic device 100 in accordance with at least one embodiment of the present disclosure. The method 700 initiates at block 702, where the electronic device 100 identifies its motion based on information provided by the gyroscope 620 and other non-visual sensors, based on feature tracks identified from imagery captured by the electronic device 100, or a combination thereof. At block 704, the electronic device 100 identifies its current pose (location and orientation) based on image and non-visual data as described above, then uses its identified motion to predict a future location of the device. For example, if the identified motion indicates that the electronic device 100 is moving in a given direction at a given amount of speed, the predicted future pose is the position of the electronic device 100 along the given direction as indicated by the given amount of speed. At block 706, the electronic device 100 identifies one or more stored descriptors associated with the predicted pose, wherein at least a subset of the one or more descriptors indicates an amount of illumination associated with the predicted pose. Based on these descriptors, the electronic device 100 predicts an amount of illumination associated with the predicted pose. At block 708, the electronic device 100 adjusts the intensity setting for a sensor of the imaging sensor 114 based on the predicted illumination, thereby preparing the sensor for the illumination conditions that the electronic device 100 is moving towards.

At block 710, the electronic device 100 identifies a scene distance for the imaging sensor 114. For example, the electronic device 100 can identify features over a set of images recently captured by the imaging sensor 114 and select features that are consistent over the set of images. The aspect of consistency can be consistency of position, consistency of a confidence level associated with identification of the features, and the like, or a combination thereof. The electronic device 100 then identifies the scene distance of the imaging sensor 114 by identifying a distance of the camera from the selected features based on descriptors associated with the features and a current pose of the electronic device 100. At block 712 the electronic device 100 adjusts gain and exposure settings for the imaging sensor 114 to balance the gain and exposure based on the device motion, the scene distance, or a combination thereof. The electronic device 100 thereby enhances the quality of images subsequently captured by the imaging sensor 114, providing for improved quality of location-based functionality supported by the captured images.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   generating, at an electronic device, one or more feature descriptors for one or more spatial features identified in imagery captured at one or more imaging sensors and one or more non-visual sensors of the electronic device, wherein each of the generated feature descriptors describes one or more of an orientation, gravity direction, and scale of one or more of the identified spatial features;
   identifying, at the electronic device, motion of the electronic device based on the generated feature descriptors; and
   balancing a gain and an exposure associated with the one or more imaging sensors based on the identified motion.

2. The method of claim 1, wherein the one or more non-visual sensors comprise a gyroscope of the electronic device.

3. The method of claim 1, wherein identifying motion based on the generated feature descriptors comprises:
   identifying a first spatial feature based on a first image captured at the electronic device; and
   identifying the motion based on a difference between a first position of the first spatial feature in the first image and a second position of the first spatial feature in a second image captured at the electronic device.

4. The method of claim 3 wherein identifying motion based on the generated feature descriptors comprises:
   selecting the first spatial feature based on a distance of the first spatial feature from the electronic device.

5. The method of claim 1, wherein balancing the gain and the exposure comprises:
   balancing the gain and the exposure further based on a depth of a scene indicated by the imagery.

6. The method of claim 5, further comprising:
   identifying the depth of the scene based on information captured by a depth camera of the electronic device.

7. The method of claim 1, wherein balancing the gain and the exposure comprises:
   predicting an illumination based on the identified motion of the electronic device; and
   balancing the gain and the exposure further based on the predicted illumination.

8. The method of claim 7, wherein predicting the illumination comprises:
   identifying a current pose of the electronic device based on the generated feature descriptors and based on data received from the one or more non-visual sensors;
   predicting a future pose of the electronic device based on the identified motion of the electronic device; and
   predicting the illumination based on the predicted future pose of the electronic device.

9. The method of claim 1, wherein balancing the gain and the exposure comprises:
   increasing the gain and reducing the exposure in response to an increase in motion of the electronic device; and
   reducing the gain and increasing the exposure in response to a decrease in motion of the electronic device.

10. A method, comprising,
    generating, at an electronic device, one or more feature descriptors for one or more spatial features identified in imagery captured at one or more imaging sensors of the electronic device, wherein each of the generated feature descriptors describes one or more of an orientation, gravity direction, and scale of one or more of the identified spatial features;
    identifying, at the electronic device, one or more capture conditions for the one or more imaging sensors based on the one or more feature descriptors, the capture conditions comprising one or more of motion of the electronic device, a distance of the one or more spatial features from the electronic device, and an illumination in an environment of the electronic device; and
    balancing a gain associated with the one or more imaging sensors and an exposure associated with the one or more imaging sensors based on the identified capture conditions.

11. The method of claim 10, wherein identifying the distance of the one or more spatial features comprises:
    identifying a first feature based on a first image captured at the electronic device; and
    identifying the distance based on a matched known feature descriptor associated with the first feature.

12. The method of claim 10, wherein balancing the gain and the exposure comprises:
    balancing the gain and the exposure further based on the identified motion of the electronic device.

13. The method of claim 12, wherein the identified motion comprises a rotational velocity of the electronic device.

14. An electronic device comprising:
    an imaging sensor to capture imagery;
    a gain control module to control a gain of the imaging sensor;
    an exposure control module to control an exposure of the imaging sensor;
    non-visual sensors to capture non-visual pose information for the electronic device; and
    a processor to
       generate one or more feature descriptors for one or more spatial features identified in imagery captured, wherein each of the generated feature descriptors describes one or more of an orientation, gravity direction, and scale of one or more of the identified spatial features;
       compare the one or more generated feature descriptors to one or more known feature descriptors to identify a matched known feature descriptor;
       identify motion of the electronic device based on the imagery and based on the non-visual pose information; and
       balance the gain and the exposure based on the identified motion.

15. The electronic device of claim 14, wherein the processor is to identify motion based on imagery by:
    identifying a first feature based on a first image captured at the electronic device; and
    identifying the motion based on a difference between a first position of the first feature in the first image and a second position of the first feature in a second image captured at the electronic device.

16. The electronic device of claim 15, wherein the processor is to identify motion based on imagery by:
    selecting the first feature based on a distance of the first feature from the electronic device.

17. The electronic device of claim 14, wherein the processor is to balance the gain and the exposure by:
    balancing the gain and the exposure further based on a depth of a scene indicated by the imagery.

18. The electronic device of claim 17, wherein the processor is to:
    identify the depth of the scene based on information captured by a depth camera of the electronic device.

19. The electronic device of claim 14, wherein the processor is to balance the gain and the exposure by:
    predicting an illumination based on the motion of the electronic device; and
    balancing the gain and the exposure further based on the predicted illumination.

20. The electronic device of claim 19, wherein the processor is to predict the illumination by:
    identifying a current pose of the electronic device based on the imagery captured at the electronic device and based on received non-visual pose information;
    predicting a future pose of the electronic device based on the identified motion of the electronic device; and
    predicting the illumination based on the predicted future pose of the electronic device.

* * * * *